United States Patent
Fujisaki

(10) Patent No.: US 11,879,877 B2
(45) Date of Patent: Jan. 23, 2024

(54) BINARY PUMP AND LIQUID CHROMATOGRAPH PROVIDED WITH SAME

(71) Applicant: SHIMADZU CORPORATION, Kyoto (JP)

(72) Inventor: Shinichi Fujisaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 826 days.

(21) Appl. No.: 16/970,070

(22) PCT Filed: Mar. 16, 2018

(86) PCT No.: PCT/JP2018/010398
§ 371 (c)(1),
(2) Date: Aug. 14, 2020

(87) PCT Pub. No.: WO2019/176081
PCT Pub. Date: Sep. 19, 2019

(65) Prior Publication Data
US 2021/0033573 A1    Feb. 4, 2021

(51) Int. Cl.
*G01N 30/32*    (2006.01)
*F04B 23/04*    (2006.01)
*F04B 49/22*    (2006.01)
*G01N 30/86*    (2006.01)

(52) U.S. Cl.
CPC ......... *G01N 30/32* (2013.01); *F04B 23/04* (2013.01); *F04B 49/22* (2013.01); *G01N 30/8658* (2013.01); *F04B 2205/05* (2013.01); *G01N 2030/326* (2013.01); *G01N 2030/328* (2013.01)

(58) Field of Classification Search
None
See application file for complete search history.

(56) References Cited

U.S. PATENT DOCUMENTS

| | | | |
|---|---|---|---|
| 7,670,480 B2 | 3/2010 | Witt | |
| 8,613,607 B2* | 12/2013 | Darsey | F01N 1/16 417/540 |
| 2006/0191581 A1* | 8/2006 | Cueni | G01N 30/20 137/625.46 |
| 2007/0107499 A1* | 5/2007 | Iwata | G01N 30/20 73/61.56 |

(Continued)

OTHER PUBLICATIONS

International Search Report for corresponding Application No. PCT/JP2018/010398, dated Jun. 19, 2018.

(Continued)

*Primary Examiner* — Michael J Dalbo
*Assistant Examiner* — Denise R Karavias
(74) *Attorney, Agent, or Firm* — Renner, Otto, Boisselle & Sklar, LLP

(57) ABSTRACT

A binary pump includes a switching valve that can be switched to a state (first state or second state) in which only one of a first pump part and a second pump part is connected to an output part, and a state (third state) in which both the first pump part and the second pump part are connected to the output part, and has a function of preventing a backflow of liquid by switching a state of the switching valve, in particular, a function of preventing a backflow of liquid when liquid delivery is performed by using both the first pump and the second pump.

10 Claims, 7 Drawing Sheets

(56) References Cited

U.S. PATENT DOCUMENTS

| | | | | |
|---|---|---|---|---|
| 2009/0205409 A1* | 8/2009 | Ciavarini | ............ | G05D 11/132 |
| | | | | 73/61.56 |
| 2010/0083739 A1* | 4/2010 | Weissgerber | .......... | G01N 30/36 |
| | | | | 73/61.56 |
| 2010/0288027 A1* | 11/2010 | Ishii | ....................... | G01N 30/32 |
| | | | | 73/61.56 |
| 2011/0315633 A1* | 12/2011 | Cormier | .............. | F16K 11/0655 |
| | | | | 251/304 |
| 2014/0318224 A1* | 10/2014 | Onoda | ................... | G01N 30/32 |
| | | | | 137/565.15 |
| 2019/0211813 A1* | 7/2019 | Yanagibayashi | ........ | F04B 13/02 |
| 2020/0400623 A1* | 12/2020 | Plachetka | .............. | G01N 30/34 |

OTHER PUBLICATIONS

Written Opinion for corresponding Application No. PCT/JP2018/010398, dated Jun. 19, 2018.

* cited by examiner ns a binary pump provided
with a switching valve, and a liquid chromatograph provided
with such a binary pump as a liquid delivery device for
delivering a mobile phase.

BACKGROUND ART

In liquid chromatography and supercritical fluid chromatography, gradient analysis in which analysis is performed while the composition of a mobile phase is temporally changed may be performed. In the gradient analysis, the composition of a mobile phase is temporally changed by delivering two kinds of solvents while changing flow rates of the solvents. A binary pump is known as a liquid delivery device for such gradient analysis. The binary pump is provided with two pump parts, and is configured to combine liquid delivered from the pump parts and output the combined liquid (see Patent Document 1).

PRIOR ART DOCUMENTS

Patent Documents

Patent Document 1: U.S. Pat. No. 7,670,480

SUMMARY OF THE INVENTION

Problems to be Solved by the Invention

In gradient analysis using a binary pump, when only one of pump parts is operating, an increase in system pressure may cause solution being delivered to flow back to a pump part whose operation is stopped. When such a backflow occurs, there is a problem that, when the pump part whose operation has been stopped is operated to start liquid delivery, a delay occurs in the liquid delivery, and a mobile phase with a desired mixing ratio cannot be obtained. Poor mixing accuracy of a mobile phase deteriorates separation and analysis reproducibility.

Further, even when both pump parts are operating, if a liquid delivery flow rate of one of the pump parts is lower than a liquid delivery flow rate of the other one of the pump parts, a backflow of liquid to the pump part having a lower liquid delivery flow rate may occur when a system pressure increases. When such a backflow occurs, a mobile phase cannot be delivered at a desired flow rate or with desired composition.

In view of the above, an object of the present invention is to prevent a backflow in a binary pump and improve liquid delivery accuracy.

Solutions to the Problems

The binary pump according to the present invention includes a first pump part, a second pump part provided separately from the first pump part, an output part for outputting liquid delivered by the first pump part and/or the second pump part, a switching valve, a first pressure sensor, a second pressure sensor, a backflow calculation part, and a backflow prevention part. The switching valve includes a first liquid delivery port to which the first pump part is connected, a second liquid delivery port to which the second pump part is connected, and an output port communicating with the output part, and is configured to be switched to any one of a first state, a second state, and a third state. The first state is a state in which the first liquid delivery port is connected to the output port and the second liquid delivery port is not connected to any port. The second state is a state in which the second liquid delivery port is connected to the output port and the first liquid delivery port is not connected to any port. The third state is a state in which both the first liquid delivery port and the second liquid delivery port are connected to the output port. The first pressure sensor detects a pressure in a space which exists between the first pump part and the switching valve as a first pressure, and the second pressure sensor detects a pressure in a space which exists between the second pump part and the switching valve as a second pressure. The backflow calculation part is configured to obtain a change rate of a system pressure detected by the first pressure sensor or the second pressure sensor, and to calculate a backflow rate to the first pump part and a backflow rate to the second pump part based on the change rate of the system pressure. The backflow prevention part is configured to switch the switching valve to the second state while the backflow rate to the first pump part calculated by the backflow calculation part exceeds a set flow rate for the first pump part or a value determined based on the set flow rate, and to switch the switching valve to the first state while the backflow rate to the second pump part calculated by the backflow calculation part exceeds a set flow rate for the second pump part or a value determined based on the set flow rate, in a case where the switching valve is set to the third state and the liquid delivery by the first pump part and the second pump part is performed.

That is, the binary pump according to the present invention includes a switching valve that can be switched to a state (first state or second state) in which only one of the first pump part and the second pump part is connected to the output part, and the state (third state) in which both the first pump part and the second pump part are connected to the output part, and has a function of preventing a backflow of liquid by switching a state of the switching valve, in particular, a function of preventing the backflow of liquid when liquid delivery is performed by using both the first pump and the second pump.

The binary pump can execute a gradient mode, such as a mode in which, from a state where the concentration of one solvent delivered by the first pump part is 100% and the concentration of the other solvent delivered by the second pump part is 0%, the concentration of the other solvent is increased, and a mode in which, from a state where the concentration of the other solvent is 100% and the concentration of the one solvent is 0%, the concentration of the other solvent is decreased.

There is a case where, in the above gradient mode, when the composition of a mobile phase is changed, the system pressure rises, and as a result, liquid is compressed in a channel and the liquid flows in a direction opposite to a liquid delivery direction of a pump. In the present application, a flow rate of flow of liquid in a direction opposite to the liquid delivery direction is defined as "backflow rate". The backflow rate increases in proportion to an increase rate of the pressure in the channel. If the backflow rate exceeds a liquid delivery flow rate of a pump, a backflow to the pump part occurs. For example, in a case where liquid is delivered at a high flow rate from the first pump part and liquid is delivered at a low flow rate from the second pump part, when the system pressure rises sharply and a backflow rate to the second pump part exceeds a liquid delivery flow rate of the second pump part, a backflow to the second pump part occurs. When the backflow occurs, the pump part on the side where the backflow occurs takes time to push back liquid of the backflow rate, and time is required for a mixing ratio of the liquid delivered by the first pump part and the liquid delivered by the second pump to reach a desired mixing ratio.

In view of the above, the binary pump of the present invention calculates a "backflow rate" generated due to the compressibility of liquid during liquid delivery using a change rate of the system pressure, and determines whether or not a backflow to each pump part occurs by comparing the backflow rate with a set flow rate for each pump part or a value determined based on the set flow rate. Then, in a case where a backflow is determined to occur in any of the pump parts, a state of the switching valve is switched so that the flow of liquid to the pump part is cut off, and the backflow is prevented. The backflow is prevented in the above manner, so that, when the prevention of the backflow is released, liquid can be quickly delivered from the pump part on the side where the backflow occurs. Accordingly, time required for a mixing ratio of the liquid delivered by the first pump part and the liquid delivered by the second pump to reach a desired mixing ratio can be shortened.

If operation of the pump part whose liquid delivery is cut off is stopped while the switching valve is switched from the third state to the first state or the second state in order to prevent a backflow, pressure on the pump part side becomes lower than the system pressure, and liquid flows back when the switching valve is returned to the third state. In view of the above, the binary pump according to the present invention preferably further includes a pre-compression operation part configured to perform a pre-compression operation of the first pump part so that the first pressure becomes closer to the system pressure while the switching valve is in the second state, and to perform a pre-compression operation of the second pump part so that the second pressure becomes closer to the system pressure while the switching valve is in the first state. By the above configuration, before the switching valve is returned from the first state or the second state to the third state, the pressure on the pump part side where the liquid delivery is cut off can be brought close to the system pressure. Accordingly, a backflow of liquid when the switching valve is returned from the first state or the second state to the third state can be prevented.

Further, as described above, since a backflow rate results from the compressibility of liquid, the magnitude of the backflow rate is considered to be proportional to a compression ratio (1/MPa) of liquid. In view of the above, in the binary pump of the present invention, the backflow calculation part preferably uses a compression ratio of liquid to be delivered by the first pump part for calculating of the backflow rate to the first pump part, and to uses a compression ratio of liquid to be delivered by the second pump part for calculating of the backflow rate to the second pump part. The compression ratio of liquid to be delivered by each pump part may be set in advance based on a user input, or may be obtained by calculation using operation of the binary pump as described later.

The backflow rate can be obtained, for example, by the following equation:

Backflow rate (μL/min)=Liquid compression ratio (1/MPa)×Pressure change rate (MPa/min)×Compression volume (μL)

Here, the compression volume (μL) is the volume in the system from a combining section (for example, a mixer) of channels from the pump parts to the pump parts.

In the binary pump of the present invention, the compression ratio of liquid to be delivered by each pump part used for calculating the backflow rate may be obtained by calculation. The above-described pre-compression operation can be used to obtain the compression ratio of liquid to be delivered by each pump part. That is, the binary pump can further include a compression ratio calculation part configured to obtain a compression ratio of liquid to be delivered by the first pump part based on a relationship between a liquid delivery amount by the first pump part and an increase amount of the first pressure during the pre-compression operation of the first pump part, and to obtain a compression ratio of liquid to be delivered by the second pump part based on a relationship between a liquid delivery amount by the second pump part and an increase amount of the second pressure during the pre-compression operation of the second pump part. In this case, the backflow calculation part is configured to calculate a backflow rate to the first pump part and a backflow rate to the second pump part using a compression ratio obtained by the compression ratio calculation part.

When the system pressure is constantly monitored, a periodic pressure fluctuation may occur. In this case, depending on an increase rate in the pressure, a backflow rate to a pump part at a low flow rate exceeds a liquid delivery flow rate of the pump part, and a backflow occurs. However, for such a periodic pressure fluctuation, even if a pressure increase that causes a backflow occurs in a short time interval, the pressure repeatedly increases and decreases in a long time interval, and a total pressure change amount can be regarded as zero. When the total pressure change amount is zero, no backflow can be considered to occur, and the necessity of preventing a backflow by switching the switching valve is considered to be low. Rather, if the backflow prevention operation by the switching valve is repeated for such a periodical pressure change, the number of times of switching of the switching valve increases, wear of components such as a rotor in the switching valve is promoted, and the life of the switching valve is shortened. Further, a disturbance in pressure due to switching of the switching valve also occurs, which is considered to adversely affect the reproducibility of chromatography analysis.

In view of the above, the binary pump according to the present invention further includes a pulsation determination part configured to read a fluctuation of the system pressure and to determine whether or not the fluctuation is a pulsation. Further, the backflow prevention part is preferably configured to set the switching valve to the third state while the pulsation determination part is determining that the fluctuation is the pulsation. By the above configuration, in a case where a periodic fluctuation occurs in the system pressure, the backflow prevention operation by the switching valve is not performed while the periodic fluctuation continues, unnecessary switching of the switching valve is suppressed, and reduction of the life of the switching valve can be suppressed. Note that, in the present application, the periodic pressure fluctuation is generally defined as "pulsation".

The inventor of the present invention has found that a periodic fluctuation occurring in the system pressure is caused by switching of operation of a plunger pump constituting a pump part, and a pulsation occurs in synchronization with liquid delivery operation of a pump part (on a high flow rate side) performing liquid delivery. Therefore, by observing a fluctuation of the system pressure for each cycle of the liquid delivery operation of a pump part performing liquid delivery, whether or not the fluctuation is a pulsation can be determined. One cycle of the liquid delivery operation of a pump part is one cycle (from start of suction to start of next suction) of operation of a plunger pump on a primary side in a case where, for example, the pump part is a serial double plunger type pump. Further, in a case where the pump part is a parallel double plunger type pump, one cycle of the liquid delivery operation is one cycle (from start of suction to start of next suction) of operation of either one of plunger pumps.

Based on the above findings, in the binary pump of the present invention, the pulsation determination part is preferably configured, when determining whether or not a fluctuation of the system pressure is the pulsation, to obtain a maximum value and/or a minimum value of the system pressure for each cycle relating to liquid delivery operation of a pump part, which is performing the liquid delivery operation, among the first pump part and the second pump part, that is, a pump part on a high flow rate side, and to determine whether or not the fluctuation is the pulsation by determining whether or not a fluctuation of the maximum value and/or the minimum value of the system pressure is within a predetermined range.

Further, the pulsation determination part may be configured, when determining whether or not a fluctuation of the system pressure is the pulsation, to obtain a maximum value and/or a minimum value of the system pressure for each cycle relating to liquid delivery operation of a pump part, which is performing the liquid delivery operation, among the first pump part and the second pump part, and to determine whether or not the fluctuation is the pulsation by determining whether or not a difference value between the maximum value and the minimum value of the system pressure is within a predetermined range.

Furthermore, the pulsation determination part may be configured, after determining that a fluctuation of the system pressure is the pulsation, to obtain, at minute time intervals, a difference between maximum value of the system pressure which is obtained immediately before the determining and difference between current system pressure and the minimum value of the system pressure immediately before the determining, and to cancel the determining that the fluctuation of the system pressure is the pulsation when the differences are out of a predetermined condition.

The liquid chromatograph according to the present invention includes an analysis channel, the binary pump, a sample injection part that is provided downstream of the binary pump on the analysis channel and injects a sample into the analysis channel, an analysis column that is provided downstream of the sample injection part on the analysis channel, and separates a sample injected into the analysis channel by the sample injection part into components, and a detector that is provided further downstream of the analysis column on the analysis channel, and detects the components separated by the analysis column.

Effects of the Invention

The binary pump according to the present invention includes a switching valve that can be switched to a state (first state or second state) in which only one of a first pump part and a second pump part is connected to an output part, and a state (third state) in which both the first pump part and the second pump part are connected to the output part, and has a function of preventing a backflow of liquid by switching a state of the switching valve, in particular, a function of preventing a backflow of liquid when liquid delivery is performed by using both the first pump and the second pump. Accordingly, improvement in liquid delivery accuracy can be achieved.

Since the liquid chromatograph according to the present invention delivers a mobile phase using the above binary pump, the composition of a solvent constituting the mobile phase is accurately controlled, and the reproducibility of the analysis is improved.

EMBODIMENTS OF THE INVENTION

Figure 1:
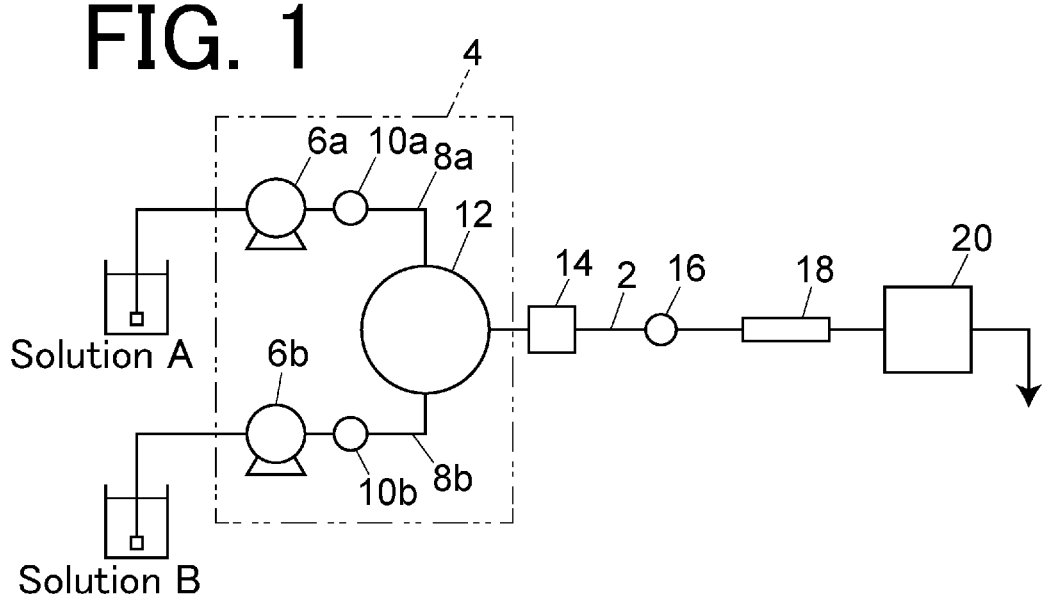
FIG. 1 is a channel configuration diagram schematically showing one embodiment of a liquid chromatograph.

Hereinafter, an embodiment of a switching valve, a binary pump, and a liquid chromatograph according to the present invention will be described with reference to the drawings.

A channel configuration of the liquid chromatograph of an embodiment will be described with reference to FIG. 1.

The liquid chromatograph of the present embodiment includes an analysis channel 2, a binary pump 4, a mixer 14, a sample injection part 16, an analysis column 18, and a detector 20. The binary pump 4 delivers a solution A and a solution B, which are solvents, to the mixer 14, and the mixer 14 mixes the solution A and the solution B delivered by the binary pump 4. The sample injection part 16 is provided downstream of the mixer 14 on the analysis channel 2 and injects a sample into the analysis channel 2. The analysis column 18 is provided further downstream of the sample injection part 16 on the analysis channel 2 and separates the sample injected into the analysis channel 2. The detector 20 is provided further downstream of the analysis column 18 on the analysis channel 2 and detects a sample component separated by the analysis column 18.

The binary pump 4 includes a first pump part 6a for sucking the solution A from a container and delivering the solution, and a second pump part 6b for sucking the solution B from a container and delivering the solution. The first pump part 6a and the second pump part 6b are connected to different ports of a switching valve 12 via a first liquid delivery channel 8a and a second liquid delivery channel 8b, respectively.

The switching valve 12, which is schematically shown in FIG. 1, can be switched at least to a first state in which only the first liquid delivery channel 8a is connected to the mixer 14, a second state in which only the second liquid delivery channel 8b is connected to the mixer 14, and a third state in which both the first liquid delivery channel 8a and the second liquid delivery channel 8b are connected to the mixer 14. Pressure sensors 10a and 10b are provided on the first liquid delivery channel 8a and the second liquid delivery channel 8b, respectively.

Note that, FIG. 1 illustrates the switching valve 12 and the mixer 14 as being connected by a single channel. However, the present invention is not limited to this, and the configuration may be such that the solution A and the solution B are output through individual channels and combined and mixed in the mixer 14. The embodiments of FIGS. 2 to 4 described later show a configuration in which the solution A and the solution B are output to the mixer 14 through individual channels.

An example of a specific configuration of the binary pump 4 will be described with reference to FIGS. 2 to 4.

In the binary pump 4 of the present embodiment, a rotary type six-way valve having six ports a to f is used as the switching valve 12. The six ports a to f are evenly disposed at intervals of 60 degrees on the same circumference. The first liquid delivery channel 8a is connected to the port a, a channel leading to the mixer 14 is connected to the port b, the drain is connected to the port c, the second liquid delivery channel 8b is connected to the port d, and a channel leading to the mixer 14 is connected to the port e, and the drain is connected to the port f. The port a forms a first liquid delivery port, and the port d forms a second liquid delivery port. Further, the port b forms a first output port, the port e forms a second output port, and the ports b and e form an output part for outputting liquid to the mixer 14.

Further, in the present embodiment, the first pump part 6a and the second pump part 6b are shown in a configuration of a serial double plunger system. However, the present invention is not limited to this, and a configuration of any system may be employed as long as the configuration delivers liquid, such as a parallel double plunger system.

A damper 22a is provided closer to the switching valve 12 than the pressure sensor 10a on the first liquid delivery channel 8a connecting the first pump part 6a and the port a of the switching valve 12. Furthermore, a damper 22b is provided closer to the switching valve 12 than the pressure sensor 10b on the second liquid delivery channel 8b connecting the second pump part 6b and the port d of the switching valve 12. Note that the dampers 22a and 22b are not indispensable constituents and do not need to be provided.

A rotor of the switching valve 12 is provided with two grooves for connecting ports adjacent to each other. The two grooves are provided longer than a length necessary to connect ports adjacent to each other (for example, a length of 75°), and a connection state of the channel can be switched to at least any of a first state (state in FIG. 2), a second state (state in FIG. 3), and a third state (state in FIG. 4) by rotation of the rotor.

Figure 2:
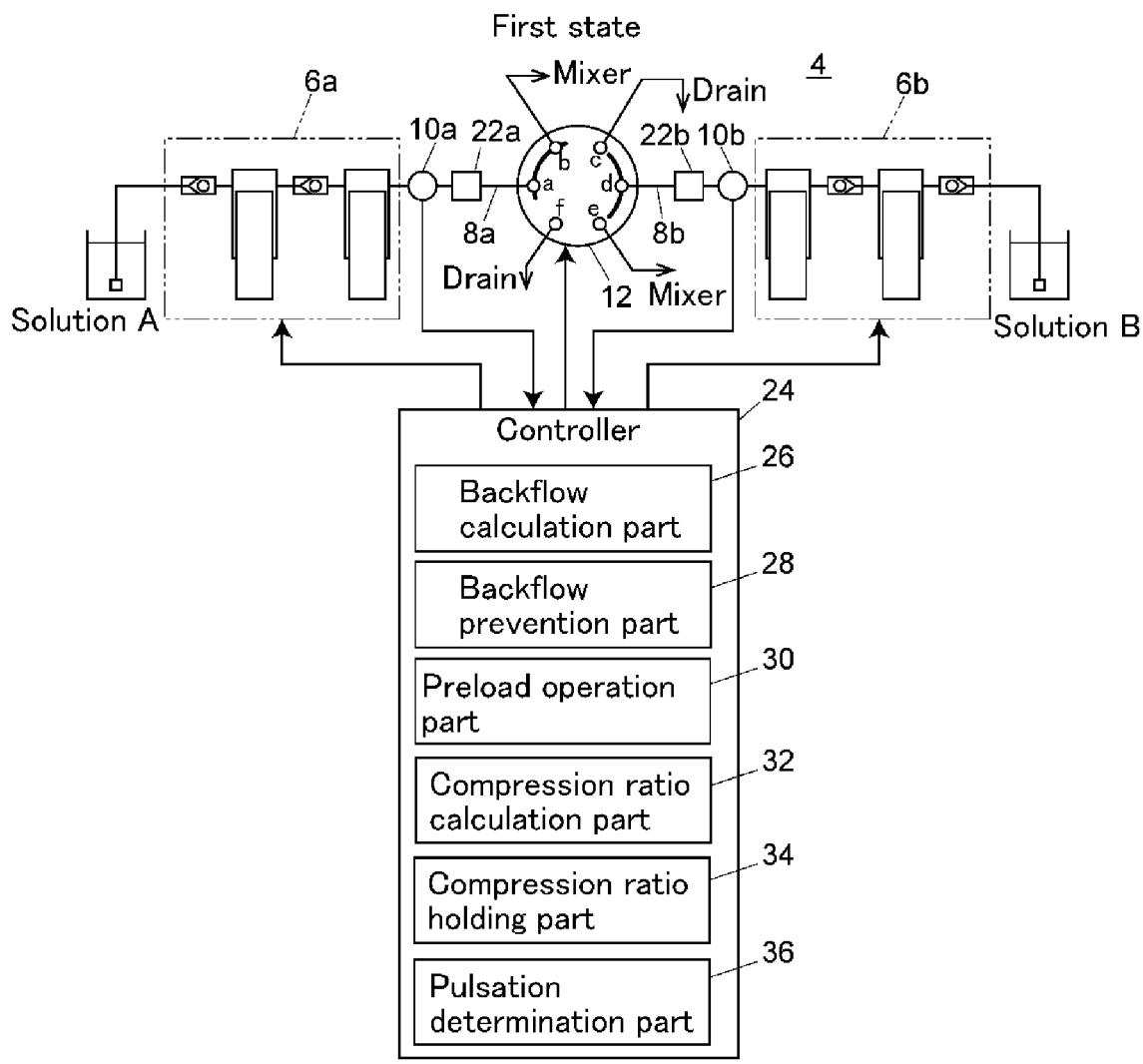
FIG. 2 is a diagram schematically showing an example of a configuration of a binary pump, and is a configuration diagram when a switching valve is in a first state.

As shown in FIG. 2, when the switching valve 12 is in the first state, the ports a and b are connected and the first liquid delivery channel 8a and the mixer 14 are connected, while the port d to which the second liquid delivery channel 8b is connected is not connected to any port, and a downstream end of the second liquid delivery channel 8b is in a state of being closed. Since the second liquid delivery channel 8b is disconnected from the mixer 14, the first state is set when only the solution A is delivered, so that the solution A can be prevented from flowing back to the second liquid delivery channel 8b side.

Figure 3:
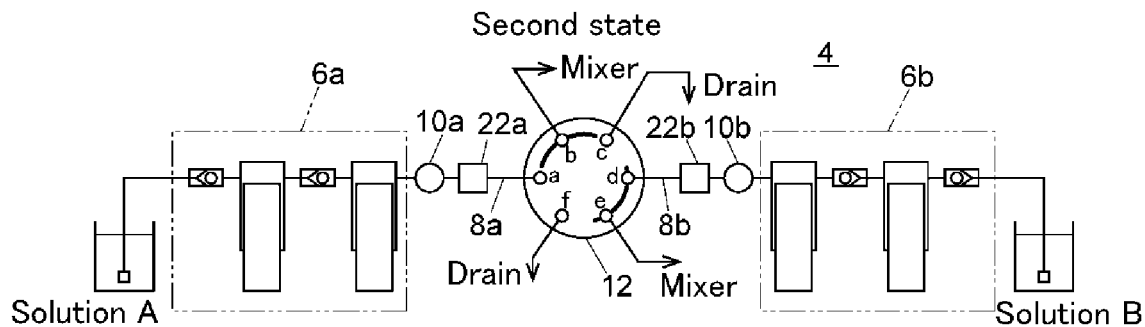
FIG. 3 is a configuration diagram when the switching valve of the binary pump is in a second state.

As shown in FIG. 3, when the switching valve 12 is in the second state, the ports d and e are connected and the second liquid delivery channel 8b and the mixer 14 are connected, while the port a to which the first liquid delivery channel 8a is connected is not connected to any port, and a downstream end of the first liquid delivery channel 8a is in a state of being closed. Since the first liquid delivery channel 8a is disconnected from the mixer 14, the second state is set when only the solution B is delivered, so that the solution B can be prevented from flowing back to the first liquid delivery channel 8a side.

Figure 4:
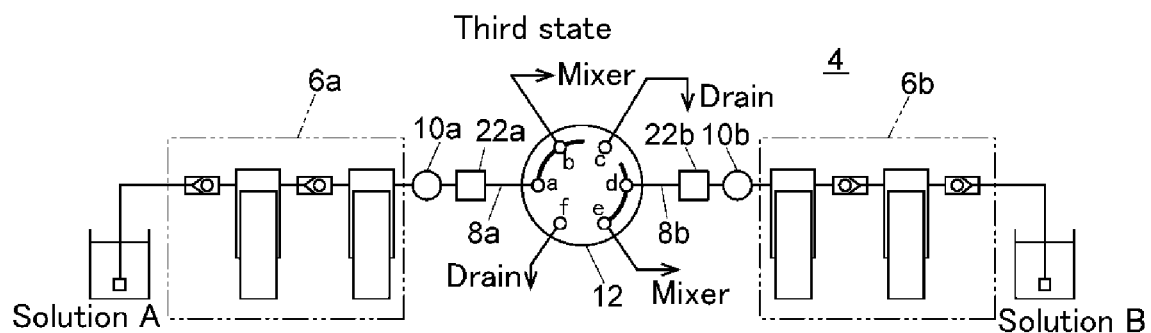
FIG. 4 is a configuration diagram when the switching valve of the binary pump is in a third state.

As shown in FIG. 4, when the switching valve 12 is in the third state, the ports a and b are connected, and at the same time, the ports d and e are connected, and the first liquid delivery channel 8a and the second liquid delivery channel 8b are both connected to the mixer 14. This third state is set when the solution A and the solution B are simultaneously delivered to the mixer 14.

Further, although not shown, the switching valve 12 can set a state where the ports a and f are connected, and, at the same time, the ports c and d are connected. By switching the switching valve 12 to this state, the first liquid delivery channel 8a and the second liquid delivery channel 8b are both connected to the drain, and the inside of the first liquid delivery channel 8a and the inside of the second liquid delivery channel 8b can be purged.

The operation of the first pump part 6a, the second pump part 6b, and the switching valve 12 is controlled by a controller 24. The controller 24 is configured to control the operation speed of the first pump part 6a and the second pump part 6b together with the switching operation of the switching valve 12 based on a preset gradient program. The controller 24 further includes a backflow calculation part 26, a backflow prevention part 28, a pre-compression operation part 30, a compression ratio calculation part 32, a compression ratio holding part 34, and a pulsation determination part 36.

Here, the controller 24 may be a dedicated computer provided in the binary pump 4, or may be a general-purpose computer, or a dedicated computer or a general-purpose computer that comprehensively controls the entire liquid chromatograph. The backflow calculation part 26, the backflow prevention part 28, the pre-compression operation part 30, the compression ratio calculation part 32, and the pulsation determination part 36 are functions obtained by an arithmetic element such as a CPU executing a predetermined program. The compression ratio holding part 34 is a function realized by a partial region of a storage device.

The backflow calculation part 26 is configured to calculate a backflow rate to each of the pump parts 6a and 6b. A backflow rate to each of the pump parts 6a and 6b is obtained by the following equation:

Backflow rate (μL/min)=Liquid compression ratio (1/MPa)×Pressure change rate (MPa/min)×Compression volume (μL)

Here, the compression volume (μL) is the volume in the system from an outlet of each of the pump parts 6a and 6b to the mixer 14. The liquid compression ratio (1/MPa) is held in the compression ratio holding part 34.

The controller 24 reads a system pressure (for example, a moving average value) detected by a first pressure sensor 22a or a second pressure sensor 22b at regular time intervals (for example, at intervals of two seconds). Each time the system pressure is read, the backflow calculation part 26 calculates a change rate (MPa/min) of the system pressure using a system pressure read previously.

In the present embodiment, the compression ratio calculation part 32 configured to calculate a compression ratio of the solutions A and B is provided in the controller 24, and a compression ratio of the solutions A and B calculated by the compression ratio calculation part 32 is held in the compression ratio holding part 34. The compression ratio calculation part 32 is configured to calculate a compression ratio using an operation amount of the pump part and an amount of increase in the pressure in the above-described pre-compression operation. Note that the compression ratio calculation part 32 is not an essential constituent, and a compression ratio of each of the solutions A and B set based on a user input may be held in the compression ratio holding part 34.

The backflow prevention part 28 is configured to compare a backflow rate to each of the pump parts 6a and 6b calculated by the backflow calculation part 26 with a set flow rate of each of the pump parts 6a and 6b so as to determine whether or not a backflow to each of the pump parts 6a and 6b occurs. In a case where a backflow to either one of the pump parts 6a and 6b occurs, the backflow prevention part 28 is configured to switch the switching valve 12 to prevent the backflow.

Figure 5:
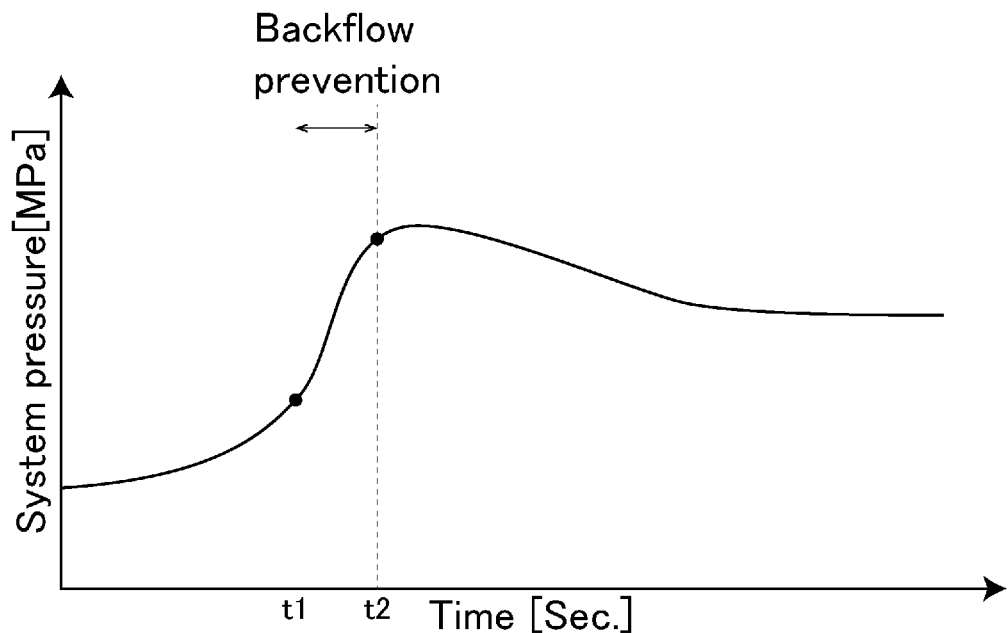
FIG. 5 is a waveform chart of a system pressure for explaining an algorithm for preventing a backflow in the embodiment.

As an example, in a case where, as shown in FIG. 5, the system pressure rises sharply and a backflow rate calculated by the backflow calculation part 26 exceeds a set flow rate of the pump part 6b when the switching valve 12 is in the third state (state of FIG. 4), the solution A is delivered at a high flow rate from the pump part 6a, and the solution B is delivered at a low flow rate from the pump part 6b, the backflow prevention part 28 determines that a backflow of the solution occurs on the pump part 6b side, and switches the switching valve 12 to the first state (state in FIG. 2). When the switching valve 12 is switched to the first state, the communication between the pump part 6b and the mixer 14 is disconnected, so that the backflow of the solution to the pump part 6b is prevented. At this time, in order to suppress an increase in the pressure in the system from the pump part 6b to the switching valve 12, the liquid delivery operation of the pump part 6b may be configured to be stopped.

After the above, when the increase in the system pressure becomes gentle and a backflow rate calculated by the backflow calculation part 26 becomes equal to or less than the set flow rate of the pump part 6b, the backflow prevention part 28 returns the switching valve 12 to the third state, and releases the prevention of the backflow.

The pre-compression operation part 30 is configured to cause the pump part 6a or 6b, whose liquid delivery is stopped while the switching valve 12 is switched to the first state or the second state by the backflow prevention part 28, to execute the pre-compression operation. The pre-compression operation refers to executing the liquid delivery operation so that the pressure in the channel 8a or 8b that is closed when the switching valve 12 is switched to the first state or the second state approaches the system pressure. In the pre-compression operation, the pressure in the channel 8a or 8b that is closed is preferably set to be approximately equal to the system pressure. Note that, if the pressure in the channel 8a or 8b that is closed when the switching valve 12 is in the first state or the second state is close to the system pressure, there is an effect of suppressing a backflow of liquid at the moment where the switching valve 12 is switched from the first state or the second state to the third state. Accordingly, for example, 70% or more, preferably 90% or more of the system pressure may be set as a target value of the pre-compression operation.

Note that, in the present embodiment, the presence or absence of a backflow is determined by comparing a backflow rate to each of the pump parts 6a and 6b calculated by the backflow calculation part 26 and the set flow rate of each of the pump parts 6a and 6b. However, the present invention is not limited to this, and the presence or absence of a backflow may be determined by comparing a backflow rate to each of the pump parts 6a and 6b calculated by the backflow calculation part 26 and a value set based on the set flow rate of each of the pump parts 6a and 6b (for example, a value slightly lower than the set flow rate).

Figure 6:
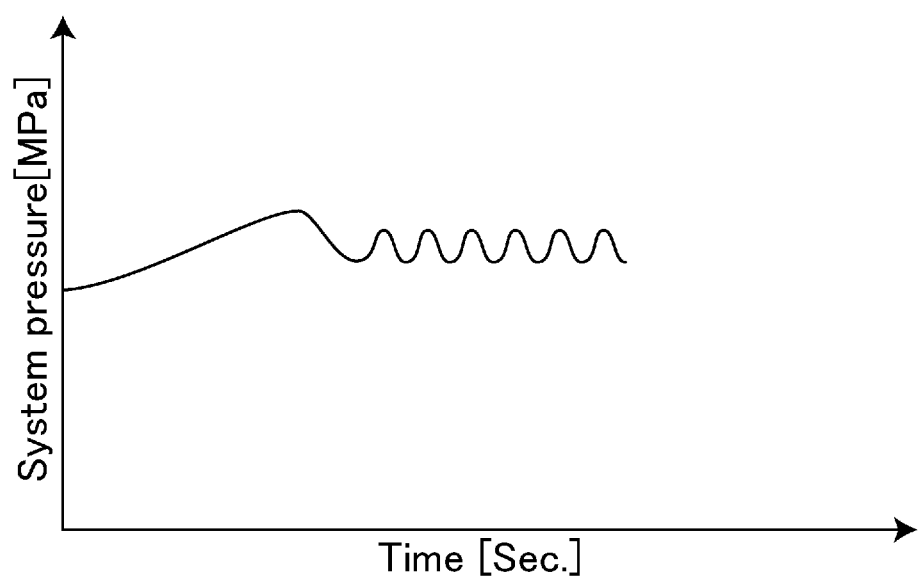
FIG. 6 is a waveform chart showing an example of a pulsation appearing in a waveform of the system pressure.

Further, when a fluctuation of the system pressure is a pulsation caused by the operation of the pump parts 6a and/or 6b as shown in FIG. 6, the backflow prevention part 28 is configured not to prevent a backflow by switching the switching valve 12 while the pulsation continues.

The pulsation determination part 36 is configured to determine whether or not a fluctuation of the system pressure is a pulsation. The backflow prevention part 28 determines whether or not to prevent a backflow by switching the switching valve 12 based on a determination result by the pulsation determination part 36.

Figure 7:
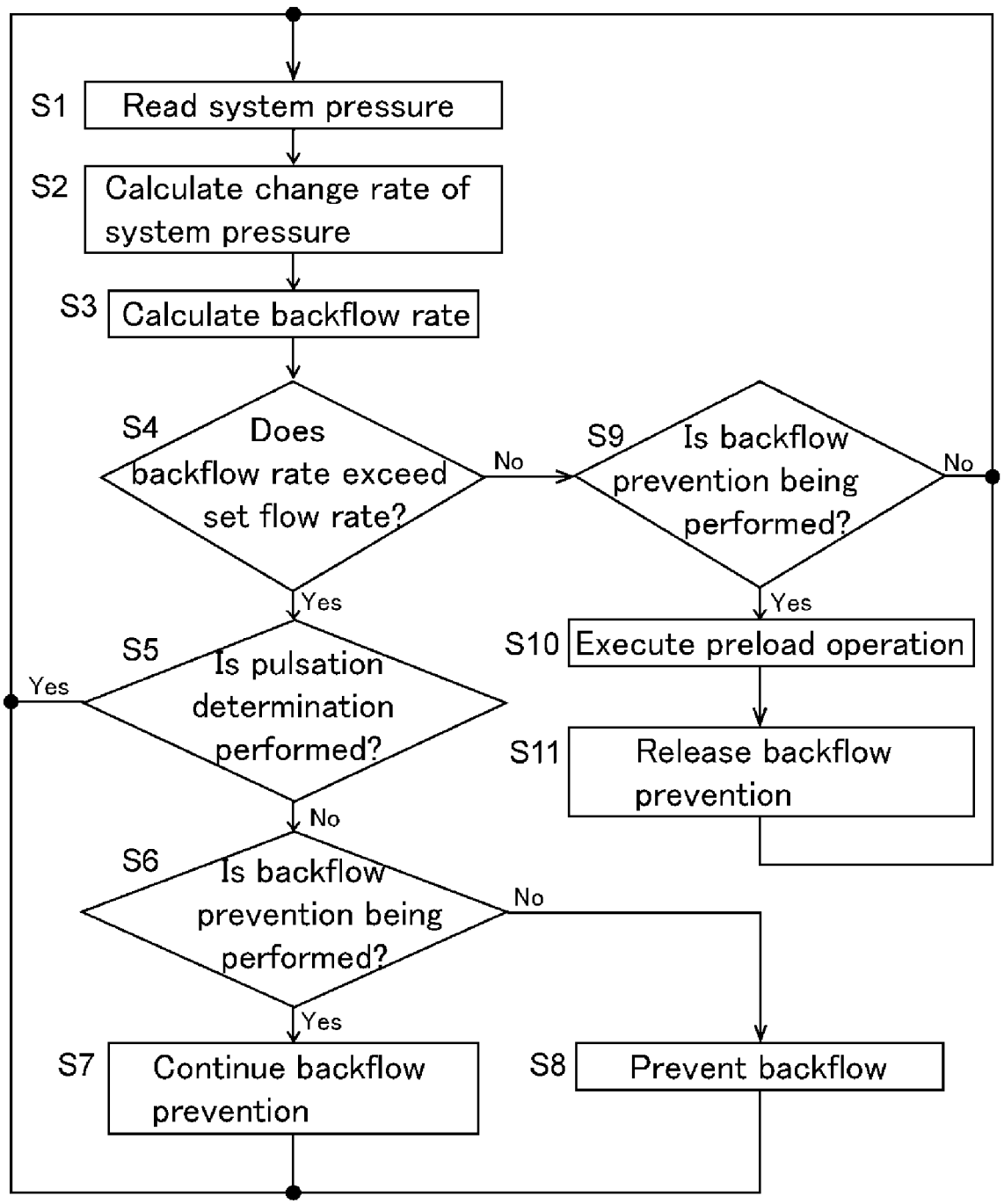
FIG. 7 is a waveform chart of the system pressure for explaining an algorithm of pulsation determination in the embodiment.

An example of an algorithm of backflow prevention in the present embodiment will be described with reference to a flowchart of FIG. 7.

The controller 24 reads the system pressure at regular time intervals (Step S1). When the controller 24 reads the system pressure, the backflow calculation part 26 calculates a change rate (MPa/min) of the system pressure, and calculates a backflow rate to each of the pump parts 6a and 6b using the change rate. (Step S3).

The backflow prevention part 28 compares a backflow rate to each of the pump parts 6a and 6b calculated by the backflow calculation part 26 with the set flow rate for each of the pump parts 6a and 6b (Step S4), and, in a case where the backflow rate exceeds the set flow rate in either one of the pump parts 6a and 6b, and the pulsation determination part 36 does not determine that the pressure fluctuation is a pulsation (Step S5), the backflow prevention part 28 sets the switching valve 12 to the first state or the second state and a backflow to the pump parts 6a or 6b is prevented (Steps S6 and S8). At this time, in a case where the switching valve 12 is already in the first state or the second state and a backflow is prevented, the state of the switching valve 12 is maintained and the prevention of a backflow is continued (Steps S6 and S7).

Even if a backflow rate of either one of the pump parts 6a or 6b exceeds the set flow rate, the backflow prevention part 28 does not perform prevention of a backflow by switching of the switching valve 12 in a case where the pulsation determination part 36 determines that the pressure fluctuation is a pulsation (Steps S4 and S5). Further, in a case where a backflow rate to either one of the pump parts 6a and 6b calculated by the backflow calculation part 26 does not exceed the set flow rate of the pump parts 6a and 6b, the backflow prevention part 28 does not perform the prevention of a backflow. In a case where the switching valve 12 is already switched to the first state or the second state and a backflow is prevented (Step S9), the pre-compression operation part 30 causes the pump part 6a or 6b whose liquid delivery is stopped to execute the pre-compression operation so that the pressure in the closed channel 8a or 8b becomes closer to the system pressure (Step S10). After the above, the backflow prevention part 28 returns the switching valve 12 to the third state to release the prevention of a backflow (Step S11).

Figure 8:
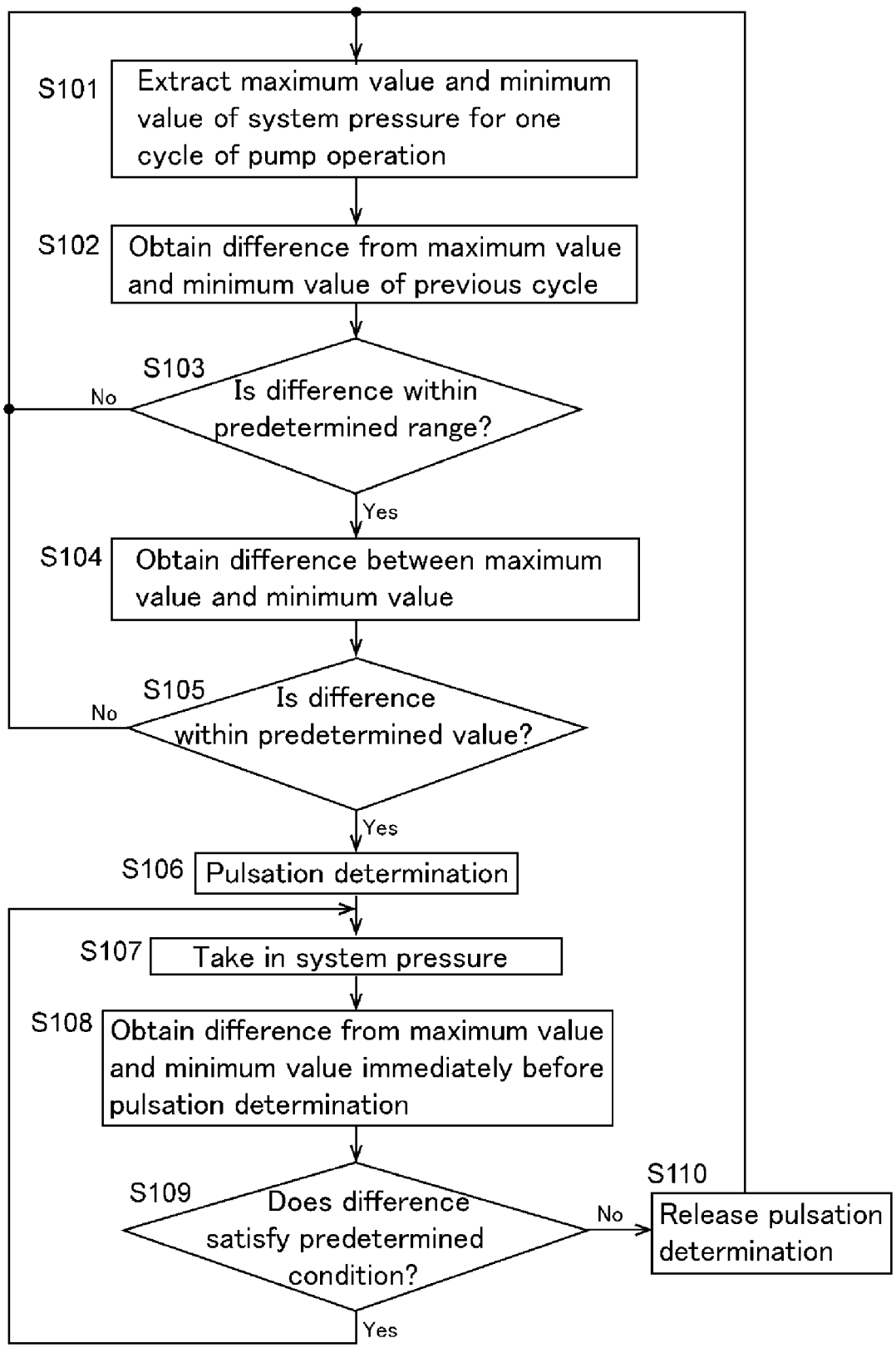
FIG. 8 is a flowchart for explaining an algorithm for preventing a backflow in the embodiment.
Figure 9:
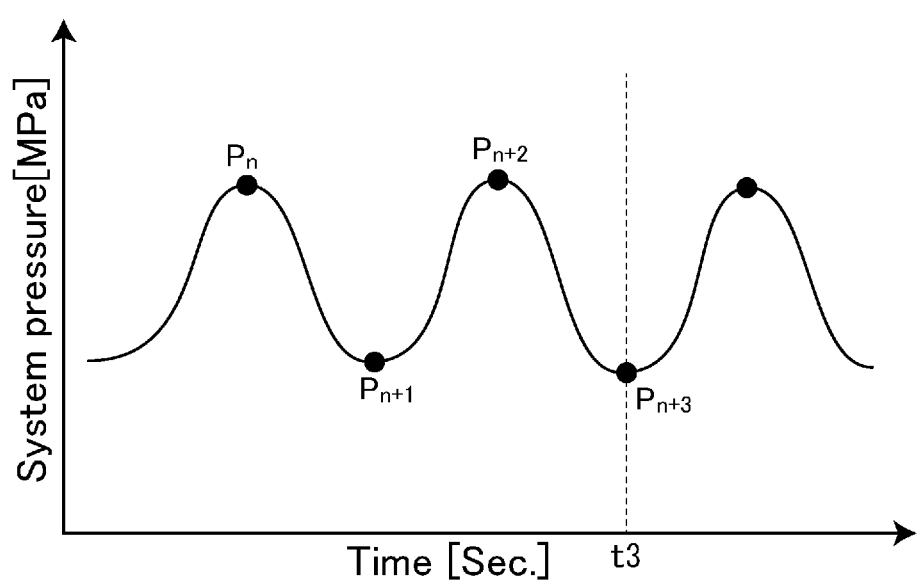
FIG. 9 is a flowchart for explaining an algorithm of pulsation determination in the embodiment.

Next, an example of an algorithm for determining a pulsation performed by the pulsation determination part 36 will be described with reference to the flowchart in FIG. 8 and the waveform chart in FIG. 9.

As described above, a pulsation of the system pressure occurs in synchronization with the liquid delivery operation of the pump part 6*a* or 6*b* on the high flow rate side. For this reason, the cycle of a pulsation coincides with the cycle of the liquid delivery operation of the pump part 6*a* or 6*b* on the high flow rate side. In view of the above, the pulsation determination part 36 extracts a maximum value and a minimum value of the system pressure for each operation cycle of the pump part 6*a* or 6*b* on the high flow rate side (Step S101), and calculates a difference between the extracted maximum value and minimum value and a maximum value and a minimum value of the system pressure in the previous cycle (Step S102). For example, in a case where there is a fluctuation in the system pressure as shown in FIG. 9, when a maximum value $P_{n+2}$ and a minimum value $P_{n+3}$ of the system pressure in a certain cycle are extracted, differences $(P_{n+2}-P_n)$ and $(P_{n+3}-P_{n+1})$ between the maximum value $P_{n+2}$ and the minimum value $P_{n+3}$ and a maximum value $P_n$ and a minimum value $P_{n+1}$ of the system pressure in the previous cycle are calculated.

In a case where both the differences $(P_{n+2}-P_n)$ and $(P_{n+3}-P_{n+1})$ are within a predetermined range (for example, ±0.1 MPa) (Step S103), a difference $(P_{n+2}-P_{n+3})$ between the maximum value $P_{n+2}$ and the minimum value $P_{n+3}$ is calculated to obtain a fluctuation range (Step S104). If the fluctuation range is equal to or less than a predetermined value (for example, 0.5 MPa), a pulsation is determined to be present (Steps S105 and S106). If the fluctuation range exceeds the predetermined value, no pulsation is determined to be present (Step S105).

Further, in a case where at least either one of the difference $(P_{n+2}-P_n)$ between the maximum values and the difference $(P_{n+3}-P_{n+1})$ between the minimum values is out of the predetermined range (for example, ±0.1 MPa) (Step S103), the pressure fluctuation is determined not to be a pulsation (Step S103).

After determining a fluctuation of the system pressure to be a pulsation, the pulsation determination part 36 takes in the system pressure at minute time intervals (for example, 6 ms) (Step S107), and obtains a difference between the taken-in system pressure and a maximum value and a minimum value immediately before the pulsation determination (Step S108). Then, when the difference deviates from a predetermined condition, the pulsation determination is canceled (Steps S109 and S110). The predetermined condition is that, for example, a difference $(P-P_{max})$ between a system pressure P and a maximum value $P_{max}$ of the system pressure immediately before the pulsation determination is equal to or less than a predetermined value (for example, 0.1 MPa), and a difference $(P_{min}-P)$ between a minimum value $P_{min}$ of the system pressure immediately before the pulsation determination and the system pressure P is equal to or less than a predetermined value (for example, 0.1 MPa).

Note that, in the above-described determination of a pulsation, three conditions, a difference in maximum values of the system pressure for each cycle, a difference in minimum values, and a fluctuation range, are used as the determination conditions. However, the present invention is not limited this, and one or two of the three conditions may be used as the determination conditions.

The embodiments of the binary pump and the liquid chromatograph described above are examples, and the present invention is not limited to these. In the above embodiments, the switching valve 12 of the binary pump is a six-way valve. However, other multi-port valves such as a four-way valve may also be used. The switching valve 12 preferably has a configuration, in which the first state in which the first liquid delivery port is connected to the output port, the second state in which the second liquid delivery port is connected to the output port, and the third state in which both the first liquid delivery port and the second liquid delivery port are connected to the output port can be selectively switched.

DESCRIPTION OF REFERENCE SIGNS

2: Analysis channel
4: Binary pump
6*a*: First pump part
6*b*: Second pump part
8*a*: First liquid delivery channel
8*b*: Second liquid delivery channel
10*a*: First pressure sensor
10*b*: Second pressure sensor
12: Switching valve
14: Mixer
16: Sample injection part
18: Analysis column
20: Detector
22: Damper
24: Controller
26: Backflow calculation part
28: Backflow prevention part
30: Pre-compression operation part
32: Compression ratio calculation part
34: Compression ratio holding part
36: Pulsation determination part

The invention claimed is:

1. A binary pump comprising:
a first pump part;
a second pump part provided separately from the first pump part;
an output part for outputting liquid delivered by the first pump part and/or the second pump part;
a switching valve that includes a first liquid delivery port to which the first pump part is connected, a second liquid delivery port to which the second pump part is connected, and an output port communicating with the output part, and is configured to be switched to any one of a first state, a second state, and a third state, wherein the first state is a state in which the first liquid delivery port is connected to the output port and the second liquid delivery port is not connected to any port, the second state is a state in which the second liquid delivery port is connected to the output port and the first liquid delivery port is not connected to any port, and the third state is a state in which both the first liquid delivery port and the second liquid delivery port are connected to the output port;
a first pressure sensor that detects a pressure in a space which exists between the first pump part and the switching valve as a first pressure;
a second pressure sensor that detects a pressure in a space which exists between the second pump part and the switching valve as a second pressure;
a backflow calculation part that is configured to obtain a change rate of a system pressure detected by the first pressure sensor or the second pressure sensor, and to calculate a backflow rate to the first pump part and a backflow rate to the second pump part based on the change rate of the system pressure; and a backflow prevention part configured to switch the switching valve to the second state while the backflow rate to the first pump part calculated by the backflow calculation part exceeds a set flow rate for the first pump part or a value determined based on the set flow rate, and to switch the switching valve to the first state while the backflow rate to the second pump part calculated by the backflow calculation part exceeds a set flow rate for the second pump part or a value determined based on the set flow rate, in a case where the switching valve is set to the third state and the liquid delivery by the first pump part and the second pump part is performed.

2. The binary pump according to claim 1, further comprising a pre-compression operation part configured to perform pre-compression operation of the first pump part so that the first pressure becomes closer to the system pressure while the switching valve is in the second state, and to perform pre-compression operation of the second pump part so that the second pressure becomes closer to the system pressure while the switching valve is in the first state.

3. The binary pump according to claim 1, wherein the backflow calculation part is configured to use a compression ratio of liquid to be delivered by the first pump part for calculating the backflow rate to the first pump part, and to use a compression ratio of liquid to be delivered by the second pump part for calculating the backflow rate to the second pump part.

4. The binary pump according to claim 3, further comprising:

a pre-compression operation part configured to perform a pre-compression operation of the first pump part so that the first pressure becomes closer to the system pressure while the switching valve is in the second state, and to perform a pre-compression operation of the second pump part so that the second pressure becomes closer to the system pressure while the switching valve is in the first state; and a compression ratio calculation part configured to obtain a compression ratio of liquid to be delivered by the first pump part based on a relationship between a liquid delivery amount by the first pump part and an increase amount of the first pressure during the pre-compression operation of the first pump part, and to obtain a compression ratio of liquid to be delivered by the second pump part based on a relationship between a liquid delivery amount by the second pump part and an increase amount of the second pressure during the pre-compression operation of the second pump part, wherein the backflow calculation part is configured to calculate the backflow rate to the first pump part and the backflow rate to the second pump part using the compression ratios obtained by the compression ratio calculation part respectively.

5. The binary pump according to claim 1, further comprising:

a pulsation determination part configured to read a fluctuation of the system pressure and to determine whether or not the fluctuation is a pulsation, wherein the backflow prevention part is configured to set a state of the switching valve so that pump parts, which are delivering liquid, among the first pump part and the second pump part are connected to the output part while the pulsation determination part is determining that the fluctuation is the pulsation.

6. The binary pump according to claim 5, wherein the pulsation determination part is configured, when determining whether or not the fluctuation of the system pressure is the pulsation, to obtain a maximum value and/or a minimum value of the system pressure for each cycle relating to liquid delivery operation of a pump part, which is performing the liquid delivery operation, among the first pump part and the second pump part, and to determine whether or not the fluctuation is the pulsation by determining whether or not a fluctuation of the maximum value and/or the minimum value of the system pressure is within a predetermined range.

7. The binary pump according to claim 6, wherein the pulsation determination part is configured, after determining that the fluctuation of the system pressure is the pulsation, to obtain, at minute time intervals, difference between current system pressure and the maximum value of the system pressure which is obtained immediately before the determining and difference between current system pressure and the minimum value of the system pressure which is obtained immediately before the determining, and to cancel the determining that the fluctuation of the system pressure is the pulsation when the differences are out of a predetermined condition.

8. The binary pump according to claim 5, wherein the pulsation determination part is configured, when determining whether or not the fluctuation of the system pressure is the pulsation, to obtain a maximum value and/or a minimum value of the system pressure for each cycle relating to liquid delivery operation of a pump part, which is performing the liquid delivery operation, among the first pump part and the second pump part, and to determine whether or not the fluctuation is the pulsation by determining whether or not a difference value between the maximum value and the minimum value of the system pressure is within a predetermined range.

9. The binary pump according to claim 8, wherein the pulsation determination part is configured, after determining that the fluctuation of the system pressure is the pulsation, to obtain, at minute time intervals, difference between current system pressure and the maximum value of the system pressure which is obtained immediately before the determining and difference between current system pressure and the minimum value of the system pressure which is obtained immediately before the determining, and to cancel the determining that the fluctuation of the system pressure is the pulsation when the differences are out of a predetermined condition.

10. A liquid chromatograph comprising:
an analysis channel;
the binary pump according to claim 1 that delivers a mobile phase in the analysis channel;
a sample injection part that is provided downstream of the binary pump on the analysis channel and injects a sample into the analysis channel;
an analysis column that is provided downstream of the sample injection part on the analysis channel, and separates a sample injected into the analysis channel by the sample injection part into components; and a detector that is provided further downstream of the analysis column on the analysis channel, and detects the components separated by the analysis column.

* * * * *